United States Patent
Ajanovic et al.

(10) Patent No.: US 6,199,145 B1
(45) Date of Patent: Mar. 6, 2001

(54) CONFIGURABLE PAGE CLOSING METHOD AND APPARATUS FOR MULTI-PORT HOST BRIDGES

(75) Inventors: Jasmin Ajanovic, Folsom; Michael W. Williams, Citrus Heights; Robert N. Murdoch, Sacramento, all of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/032,434

(22) Filed: Feb. 27, 1998

(51) Int. Cl.[7] .................................................. G06F 12/00
(52) U.S. Cl. ......................... 711/149; 711/105; 711/131; 711/150; 711/154
(58) Field of Search ................................ 711/1, 4, 5, 100, 711/104, 105, 131, 149, 150, 154

(56) References Cited

U.S. PATENT DOCUMENTS

| | | | |
|---|---|---|---|
| 5,479,635 | * 12/1995 | Kametani | 395/405 |
| 5,604,883 | * 2/1997 | King et al. | 395/481 |
| 5,651,130 | * 7/1997 | Hinkle et al. | 395/432 |
| 5,664,153 | * 9/1997 | Farrell | 711/154 |
| 5,666,323 | * 9/1997 | Zagar | 365/233 |
| 5,844,856 | * 12/1998 | Taylor | 365/230.05 |
| 5,940,848 | * 8/1999 | Bains | 711/1 |
| 5,953,740 | * 9/1999 | King et al. | 711/118 |

* cited by examiner

Primary Examiner—Eddie P. Chan
Assistant Examiner—Kimberly McLean
(74) Attorney, Agent, or Firm—Jeffrey S. Draeger

(57) ABSTRACT

A page closing method and apparatus for multi-port host bridges. According to a method disclosed, a plurality of memory access commands are received from a plurality of command ports. A command is selected from one of the command ports to be the next memory access command executed. A number of pages of memory are closed in response to the command selected as the next memory access command. The number of pages closed is determined at least in part on which command port provides the next memory access command.

20 Claims, 6 Drawing Sheets

CONFIGURABLE PAGE CLOSING METHOD AND APPARATUS FOR MULTI-PORT HOST BRIDGES

BACKGROUND OF THE INVENTION

1. Field of the Invention

The present invention pertains to the field of memory access in a processing system. More specifically, the present invention pertains to the field of intelligently closing pages in a memory system to enhance overall performance in the processing system.

2. Description of Related Art

Faster memory access typically enhances overall performance of computers and other data processing systems. Memory access improvements may result from, among other things, efficient memory access arbitration, efficient memory access circuitry, or both. With system memories being accessed via multiple ports utilizing different types of memory access commands, advancing memory access stream efficiency requires memory access management beyond that provided by the prior art.

Page mode memory access is one technique used with a conventional row address strobe (RAS) and column address strobe (CAS) accessed memory. In a page mode memory system, a row address is provided on a bus to a memory device and the RAS signal is activated when the row address is available to the memory. An entire row of the memory is internally read according to the row address asserted. Similarly, a column address is provided on the bus and the CAS signal asserted to provide externally a subset of the entire row as selected by the column address. The entire row of memory (i.e., an entire page) may be accessed by altering only the CAS signal.

Access to another page of memory is referred to as a page miss if the new page resides in a device accessed by the same RAS signal. A page miss requires that the current page be closed before the new page may be accessed. Thus, the RAS signal must be deasserted and the RAS lines precharged before the new row address can be driven and the RAS signal asserted. A number of clock cycles are consumed when a memory page miss occurs due to the precharge period necessary to open a new page. Unfortunately, since memory access destinations are not always predictable, memory subsystems regularly encounter unexpected page misses and therefore incur the full delay of the precharge period. Memory throughput may be increased by reducing the number of such unexpected page misses.

One example of a prior art technique which attempts to reduce the impact of page misses is to close pages whenever an idle cycle appears on the bus. Such a technique may be used where an idle cycle indicates a high likelihood that the next memory access will be to a different page than that currently being accessed. By closing pages during such idle cycles, the time delay for the precharge can be at least partially absorbed by the idle cycle.

To facilitate efficient memory page closing, current memory chips are capable of executing commands which automatically close pages upon completion. For example, synchronous dynamic random access memories (SDRAMs) can execute read with auto-precharge and write with auto-precharge commands. Thus, if the system can accurately predict when page changes may occur these commands may be utilized to automatically close pages, thereby achieving more efficient operation than may occur if the page miss is later detected and the precharge executed as a separate command.

One complication to implementing an efficient page closing policy is the use of multiple-bank memory architectures. Multiple-bank memories allow more than one bank to remain open at a time, thereby allowing multiple open pages and generally improving memory access efficiency. Such memories do, however, complicate page closing by adding the option of closing all pages, only an affected page (i.e., one which needs to be closed to access the page indicated by the next memory access command), or some other combination of pages.

Another complication to implementing an efficient page closing policy is the use of multiple-port bus bridges to access memory. Such bridges may receive memory access commands from several sources. For example, a prior art bus bridge may communicate with at least a host bus and a secondary bus such as a peripheral components interconnect (PCI) bus. Since the bus bridge arbitrates memory access between the various ports, memory access sequencing may be further disturbed by this arbitration when stream switching occurs.

With these and other complications to page access prediction, configurable page management circuitry may be desirable to allow tuning for a variety of system arrangements. Furthermore, visibility into the arbitration between multiple command ports could enhance page closing decision making. Prior art page management techniques do not adequately consider the effects of selecting commands from different command ports and/or do not allow sufficient configuration of page closing characteristics.

SUMMARY

A page closing method and apparatus for multi-port host bridges is disclosed. According to a method disclosed, a plurality of memory access commands are received from a plurality of command ports. A command is selected from one of the command ports to be the next memory access command executed after a current memory access command. A number of pages of memory are closed in response to the command selected as the next memory access command. The number is determined at least in part on which command port provides the next memory access command.

BRIEF DESCRIPTION OF THE FIGURES

The present invention is illustrated by way of example and not limitation in the figures of the accompanying drawings.

DETAILED DESCRIPTION

The present invention provides a configurable method and apparatus for multi-port host bridges. In the following description, numerous specific details such as particular bus protocols, bus cycle types, register arrangements, and logic partitioning choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

The present invention advantageously provides a configurable mechanism which utilizes knowledge of command type, source, and memory destination to intelligently implement a page management policy. By utilizing such command information, some embodiments of the present invention allow page closing latencies to be reduced when page changes are accurately predicted. In furthermore, by being configurable, some embodiments of the present invention provide flexibility to adjust the page closing policy to better predict memory access destinations and thereby reduce memory access latencies.

Figure 1:
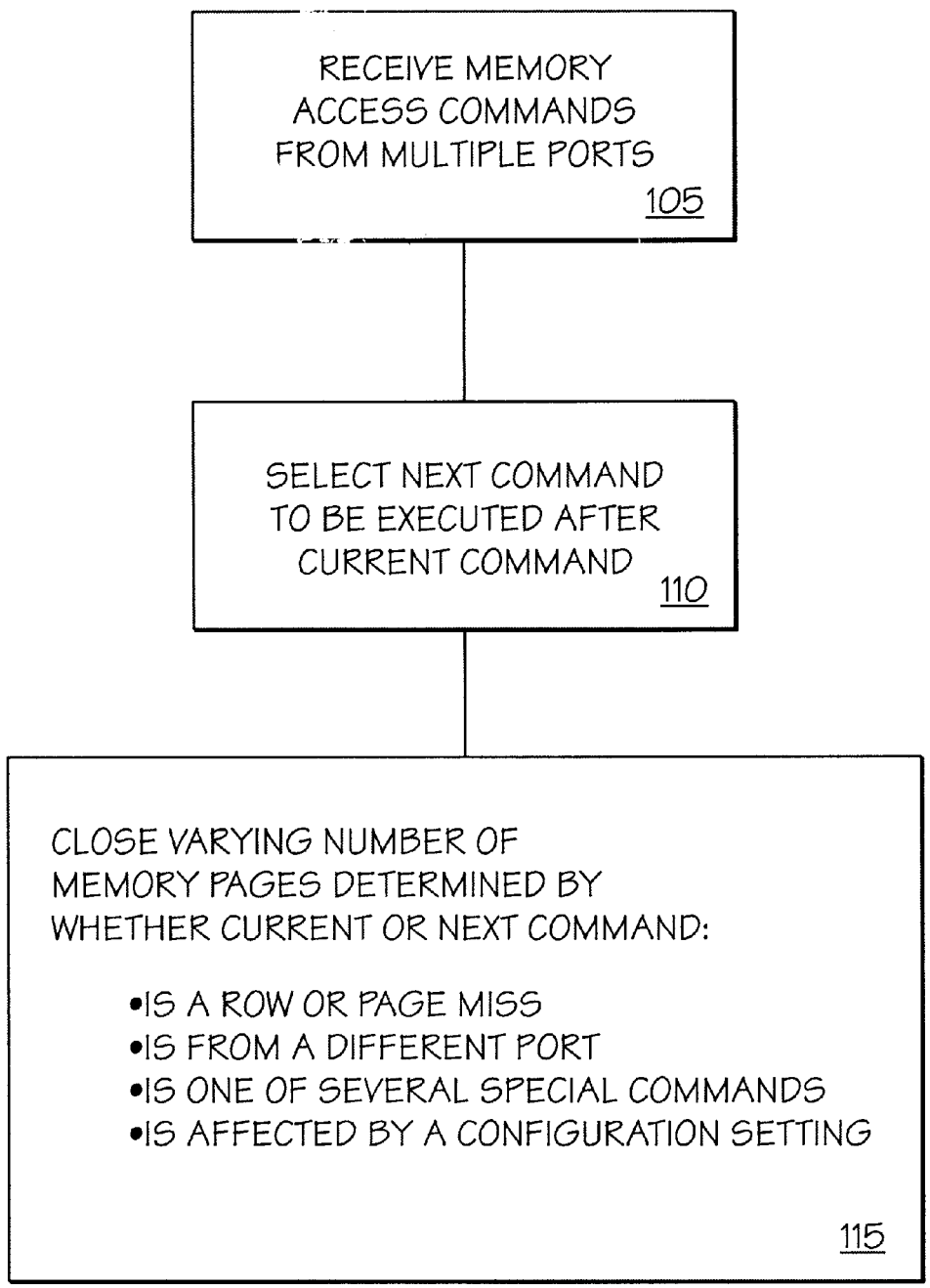
FIG. 1 illustrates one embodiment of a method of closing memory pages according to the present invention.

FIG. 1 illustrates one embodiment of a page closing method of the present invention. In step 105, memory access commands are received from multiple command ports. Each command port represents a different interface circuit which is capable of receiving commands from a different bus agent or set of bus agents, or a common bus agent communicating using a different protocol. As such, the memory access commands requested by the various ports are often unrelated or at least do not access sequential memory locations.

From the various memory access commands available at the multiple ports, a next memory access command to be executed after the current memory access command is selected as shown in step 110. Any known or otherwise convenient arbitration algorithm may be used in conjunction with the present invention. Some embodiments, however, may require that information from the arbitration process be passed along to page management circuitry to assist in page closing decisions.

As illustrated in step 115, such page management circuitry then closes a number of memory pages which is determined by the current and/or the next memory access command. In multiple bank memory chips such as SDRAM chips, a number of factors may be considered when determining whether to close one page or multiple pages of the memory chip. When the evaluation of these factors result in an accurate prediction of page closing needs, the impact of precharge latencies on memory access times may be reduced.

Two important factors in determining how many pages to close are whether the next command is a row miss or whether the next command is a page miss. In one embodiment of the present invention, multiple pages may exist within a particular row of memory (a row being defined as that portion of memory which may be accessed using a single row address). Additionally, this embodiment may only allow multiple pages to be open within the same row. Thus, if a row miss occurs, multiple pages are closed. On the other hand, if a page miss occurs, the next page to be accessed may fall within the same row, and it may be unnecessary to close more than the "affected" page since there is no row conflict. The other open page or pages may be likely to be again referenced in the near future.

A page is an "affected" page if it is a page which is closed to accommodate the opening of a page which is accessed by the next memory access command. For example, in the case of a system using page-level interleaving and two bank SDRAM memory, the even page currently would be the affected page if a next memory access command sought access to an even page which is not currently open, but is accessed by the same RAS. Both pages would be affected if the next memory access command sought access to a page which is in another row, at least in a system where two paces may only be open when they are in the same row.

Another factor in deciding how many pages to close is whether execution of the next command will constitute a change in command streams. Such a command stream switch occurs when the next command originates from a different port than the current command. Under locality of reference principles, it is well known that memory accesses from a single stream of memory access commands are likely to access nearby memory locations; however, when a change in the source of the memory access commands occurs, such locality is not likely to be preserved. Accordingly, using techniques of the present invention, a memory access subsystem having visibility into the arbitration between multiple command ports can close multiple pages when a page miss occurs due to a command stream switch.

Certain specialized commands may also represent an opportunity to close multiple pages of memory if such commands are likely to result in page misses or other complications in subsequent memory accesses. One example is a write to an internal configuration register within the memory access subsystem. Such a write may change memory access configuration registers, and therefore closing pages may be appropriate or required to ensure that new memory accesses occur properly. A memory refresh cycle typically requires that all affected memory pages be closed, therefore it may be advantageous to use a command which automatically closes all pages prior to a refresh command. Additionally, when an access to a data structure such as a memory address translation table occurs, it may be highly likely that subsequent accesses will be to different pages in memory, and therefore advantageous to automatically close pages subsequent to these accesses.

Finally, as illustrated in step 115, any combination of the presumptions of when memory pages should be closed may be controlled by specific configuration registers. Such control through configuration registers allows efficient memory access to be achieved even in systems where memory access patterns do not conform to the patterns for which the default settings were designed. Such flexibility may also be useful in accommodating a variety of memory arrangements (e.g., the use of memory chips with different numbers of available internal banks).

Figure 2:
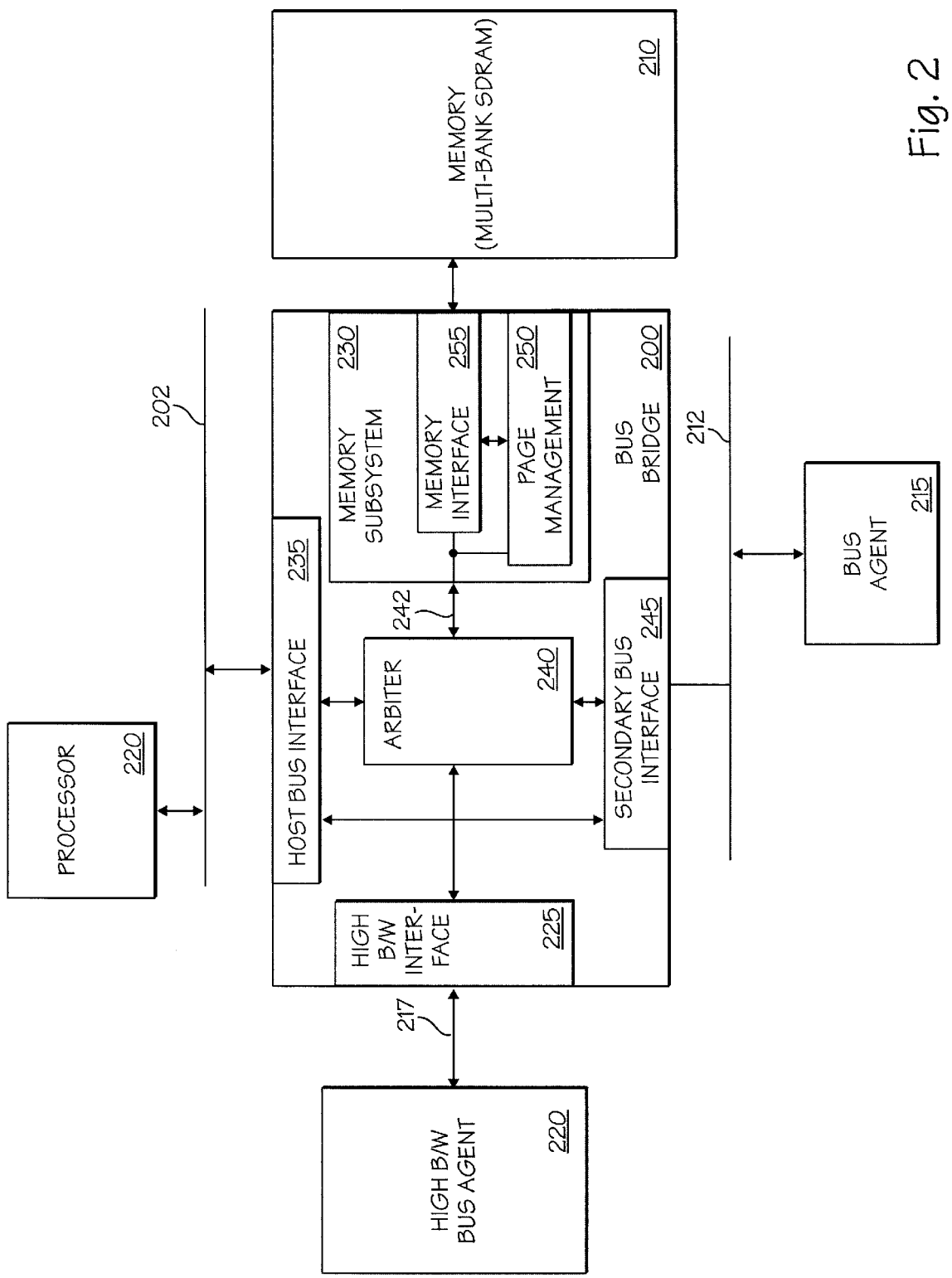
FIG. 2 illustrates one embodiment of a processing system having a page management circuit to implement page closing according to the present invention.

FIG. 2 illustrates one embodiment of a processing system having a bus bridge 200 which performs page closing according to the present invention. In particular, a memory subsystem 230, which includes a memory interface 255 and a page management circuit 250, communicates with an arbiter 240 via a bus 242 to gain visibility into forthcoming memory access commands. With knowledge of current and next memory access commands, the page management circuit 250 closes pages in a memory 210 after weighing the factors discussed with respect to step 115 in FIG. 1.

While the arbiter 240 needs to pass information regarding the next memory cycle to the memory subsystem 230, details of the arbiter 240 are not crucial to the present invention. The particular arbitration technique used by the arbiter 240 may vary according to the particular system involved. In the illustrated embodiment, the arbiter 240 selects memory access commands from one of three ports via a host bus interface 235, a high bandwidth interface 225, and a secondary bus interface 245.

The host bus interface 235 presents memory access requests to the arbiter 240 from bus agents on a host bus 202. In the illustrated embodiment, a processor 205 is one such bus agent situated on the host bus 202. Cache memories, other processors, or other bus agents may also be situated on the host bus 202 and thus may also be the source of commands ultimately presented to the arbiter 240.

The secondary bus interface 245 similarly services a secondary bus 212 and at least one bus agent such as bus agent 215. Again, other bus agents may be present on the secondary bus 212. Additionally, in some embodiments, the secondary bus interface 245 may communicate with the host bus interface 235 in order to perform snoop cycles on the host bus 202.

The high bandwidth interface 225 services a high bandwidth bus agent 220 over a high bandwidth bus 217. The high bandwidth bus agent 220 may be capable of generating several different types of memory access commands. For example, the high bandwidth bus 217 may be an accelerated graphics port (A.G.P.) bus over which the high bandwidth bus agent 220 may generate normal and high priority A.G.P. read and write commands as well as FRAME# based memory access commands (detailed information regarding the A.G.P. protocol is available in the A.G.P. Interface Specification, revision 1.0, available from Intel Corporation in Santa Clara, Calif.). Since the arbiter 240 can pass information about the origin and type of memory access command to the memory subsystem 230, the page management circuit 250 considers such information in making page closing decisions.

Figure 3:
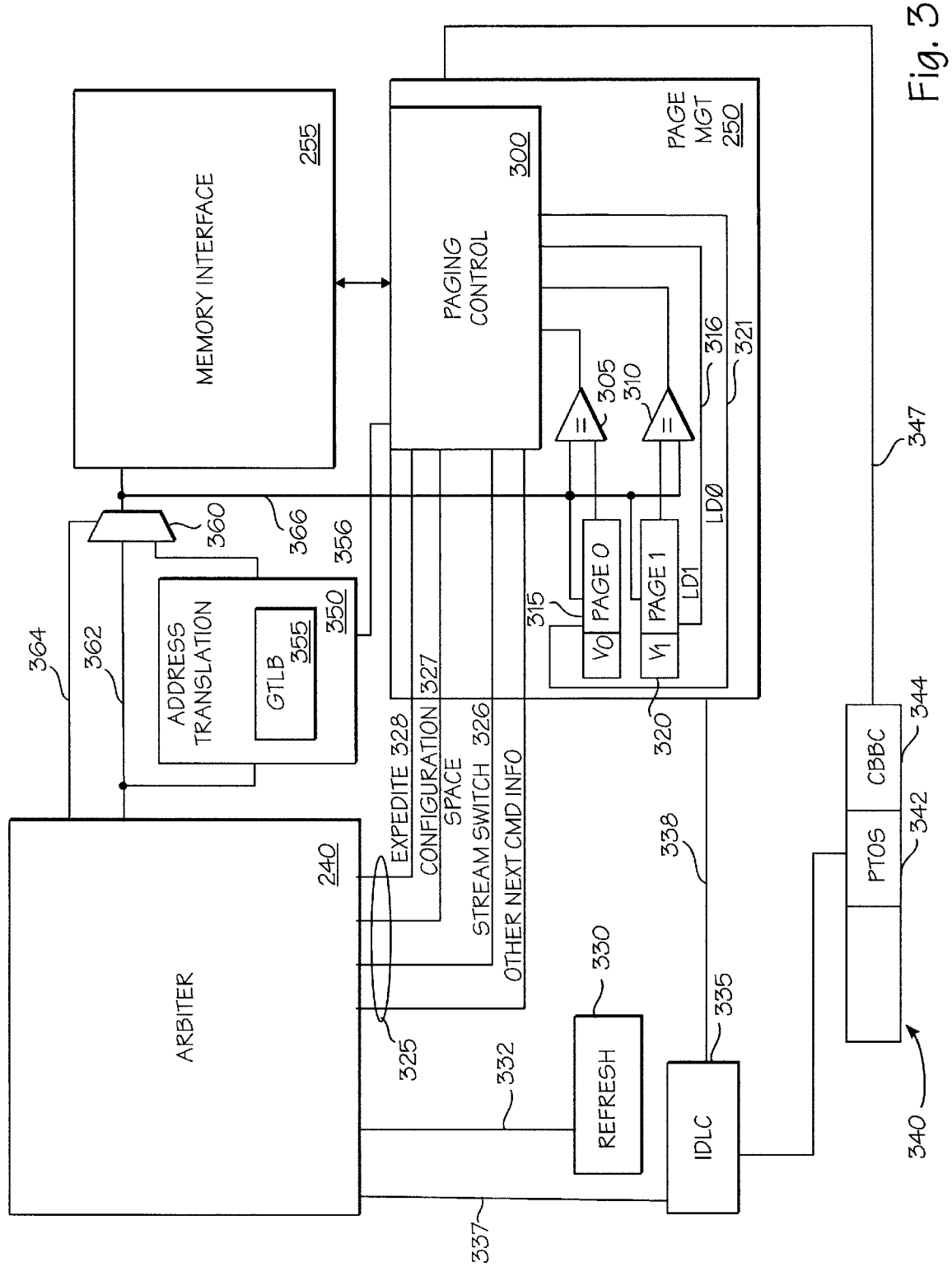
FIG. 3 illustrates details of one embodiment of the arbiter and the memory subsystem of the bus bridge in FIG. 2.
Figure 4:
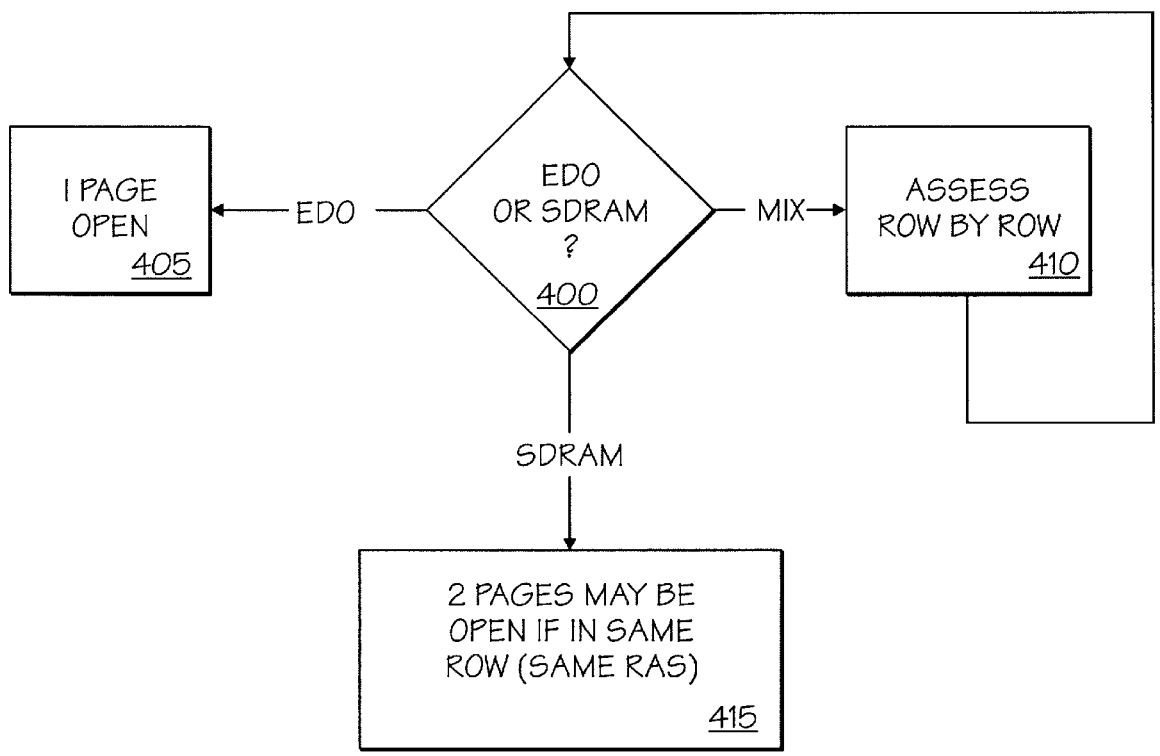
FIG. 4 illustrates one embodiment of a method for determining how many and which pages may be simultaneously open in one embodiment of the present invention.
Figure 5:
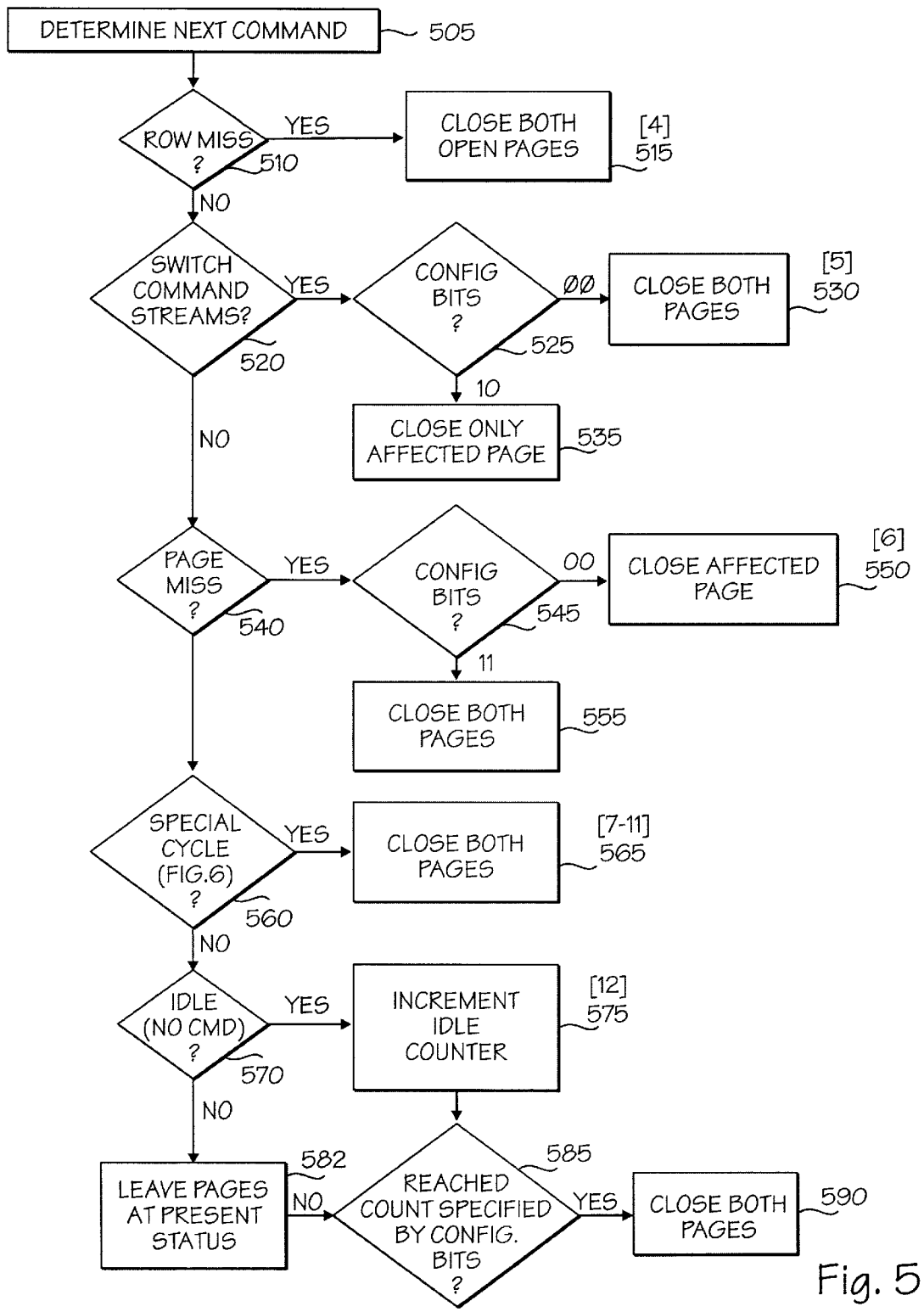
FIG. 5 illustrates one embodiment of a method of closing pages according to the present invention.
Figure 6:
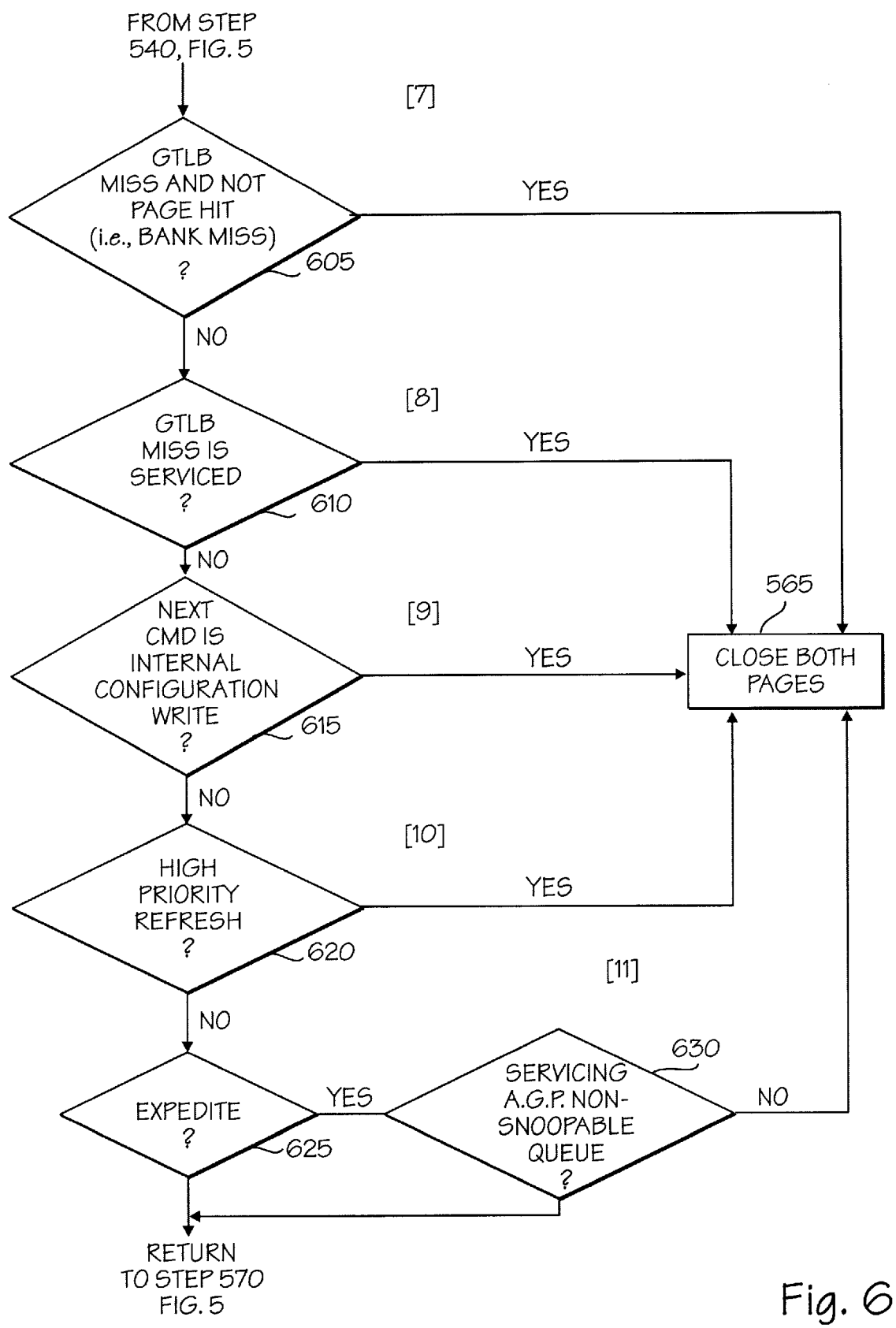
FIG. 6 illustrates one embodiment of step 560 from FIG. 5 of detecting special cycles.

FIG. 3 illustrates further details of one embodiment of the arbiter 240 and the memory subsystem 230 including the memory interface 255 and the page management circuit 250. The operation of the embodiment illustrated in FIG. 4 may be understood via the flowcharts in FIGS. 4 through 6. FIG. 4 illustrates one embodiment of a method for determining how many and which pages may be simultaneously open in one embodiment, and FIGS. 5 and 6 illustrate one embodiment of a method of closing pages according to the present invention.

FIG. 4 illustrates that either extended data out (EDO) or SDRAM memory may be accommodated by one embodiment of the present invention. If the memory is EDO memory as decided in block 400, only one page may be kept open as indicated in block 405. If the memory is SDRAM memory, two pages may be kept open as long as they are in the same row according to block 415. In other words, as long as the memory is selected by the same RAS signal, two pages within that memory may be open simultaneously.

In a configuration using dual in-line memory modules (DIMMs), such a group of memory cells within which a set of pages may be accessed using a single RAS signal may be referred to as a socket-row. In one exemplary embodiment, the memory 210 is arranged in three rows (sockets) of DIMMs of two-bank SDRAM chips, each socket having two RAS signals (one per socket-row). In another embodiment, four rows of DIMMs may be used, each of which also has two dedicated RAS signals.

As indicated in block 410, however, a mix of EDO and SDRAM memory may be accommodated in a system of the present invention. In such case, the EDO or SDRAM memory should be separated into different rows, and the evaluation of how many pages may be kept open is performed on a row by row basis.

FIG. 5 illustrates one embodiment of a method applicable where a two bank SDRAM memory is present and/or four or more bank SDRAM memory is configured such that it operates as a two bank SDRAM memory. Referring also to the hardware illustrated in FIG. 3, the arbiter 240 determines a next command as indicated in step 505. This next command is a memory access command which will be executed by the memory interface 255 after the current command completes. Using a set of signal lines 325, the arbiter 240 communicates sufficient information regarding the next command to a paging control circuit 300. Such information passed onto the paging control circuit 300 allows that circuit to automatically close pages upon completion of the current command, thereby reducing the impact of the precharge latency which occurs when an actual page miss does occur.

It should be noted that many steps shown in FIGS. 5 and 6 typically are not executed in a sequential manner but rather are simultaneously evaluated or evaluated over a number of clock cycles fewer than the total number of decision blocks shown in these figures. As is known to one of skill in the art, combinational and /or sequential logic can be designed to perform these evaluations in such a parallel fashion.

Additionally, certain conditions may overlap. For example, a stream switch and a special cycle may occur and an expedite cycle may be the command causing the stream switch. In one embodiment, this method is implemented hierarchically with earlier rules taking precedent, and multiple page closings being favored in conjunction with an aggressive page closing policy. In other embodiments, any of these rules may be given precedence where a potential conflict occurs, and/or such preferences may be programmed into configuration registers such that various system environments may be accommodated.

According to the method of FIG. 5 and specifically step 510, if a row miss occurs, the paging control circuit 300 signals to the memory inter face 255 to close both open pages (if more than one page is open). A row miss may be detected by the page management circuit 250 using system memory configuration information to determine if the next access addresses a new socket-row (i.e., if a different RAS is required).

As illustrated in steps 520 to 535, a switch in command streams (signaled on a stream switch signal line 326) may also cause one or more pages to be closed. If a stream switch is detected in step 520, a set of close both bank control (CBBC) bits 344 in a configuration register 340 are tested by the paging control circuit 300 via signal line(s) 347 as indicated in step 525. In one embodiment, the default setting for these bits is 00 which results in both pages being closed as shown in step 530. Alternately, if the bits are set to 10, the paging control circuit 300 may close only the affected page as shown in step 535.

Thus, a variable number of pages may be closed based at least in part on which of the input ports or command streams generates the next memory access command. Configuration bits and other special conditions may also influence how many pages are closed in a particular situation.

As illustrated in step 540, a variable number of pages may also be closed if only a page miss occurs. Memory addresses are passed from the arbiter 240 via a bus 362 to the memory interface 255 and the page management circuit 250. In some cases an address translation may be performed. Thus, a multiplexer 360 selects either the address indicated by the arbiter 240 or a translated address from an address translation unit 350. The multiplexer 360 is controlled by the arbiter 240 via a signal line 364 according to the type of cycle selected by the arbiter.

In any case, the address (or at least the page number portion) for the next memory access command is provided to the page management circuit 250 over a bus 366. A first comparator 305 tests whether the page number for the next memory access command matches that stored in a first page register 315 ("PAGE 0"). Where page interleaving is used, the first page register may store the page number of the currently open even page. A second comparator 310 compares the page number of the next command the value stored in a second page register 320 ("PAGE 1," in one embodiment, the odd page register).

The paging control circuit is coupled to receive the results from comparators 305 and 310 and is coupled to determine whether the value in each page register is valid as indicated by the valid bits (V0 and V1) associated with the page registers 315 and 320. Thus, the page management circuit 250 determines whether a page miss occurs.

In response to a page miss, one of the page registers is typically loaded with the page number of the newly accessed page. The paging control circuit 300 generates a load signal (LD0) on signal line 321 to load the first page register if the page number of the next command is an even page number and either differs from one validly stored in the page register 315 or if the value stored in that register is not a valid page number. Similarly, a second load signal (LD1) is generated on signal line 316 to load the second page register 320 with the page number of the next command if the page number of the next command is odd and either differs from one validly stored in the page register 320 or if the value stored in that register is not a valid page number.

Again, as shown in step 545, the CBBC configuration bits 344 of the configuration register 340 may be tested to determine how many pages to close if a page miss is detected. The default setting of 00 results in only the affected page being closed as shown in step 550. However, if the CBBC bits are set to 11, both pages are always closed on a page miss as shown in step 555.

As illustrated in step 560 and further detailed in FIG. 6, a variety of special cycles may cause both pages to be closed as shown in step 565. One special cycle illustrated in step 605 of FIG. 6 may occur in a system where the high bandwidth interface 225 shown in FIG. 2 accepts A.G.P. commands. In such a system, a graphics aperture remapping table (GART) (a table used to map pages of graphics information into memory) may be used in conjunction with the address translation unit 350. A graphics translation lookaside buffer (GTLB) 355 may also be included in the bus bridge 200 to expedite translation of graphics addresses in an analogous manner to the use of a translation lookaside buffer to translate virtual page numbers in well known paging techniques. For more information on the graphics address remapping function, see the A.G.P. Interface Specification.

Since the GART functions much as a page table, it is often located in a portion of memory separate from commands and data being accessed by most memory access commands. Thus, it is unlikely that any access to the GART will be at all proximate to prior or subsequent memory accesses. Accordingly, when an address is driven by the arbiter 240 on the bus 362 for translation by the address translation unit 350, and the address to be translated is not found in the GTLB 355, the paging control circuit 300 is notified via signal line 356. If the access is not a page hit (i.e., it is a bank miss), it is unlikely that the GART is currently being accessed, and both pages are accordingly closed as shown in step 565 in preparation for accessing the GART in a subsequent cycle. Similarly, as shown in step 610 it is prudent to close both open pages after a GTLB miss is serviced because it is unlikely that the next command will access the GART.

Step 615 indicates that when the next command is an internal configuration register write for the bus bridge, both pages will be closed. This may be due to the fact that writes to internal configuration registers may change paging policy and/or other memory management variables. Accordingly, both pages are closed when the arbiter 240 sends a configuration space write signal to the paging control circuit 300 as shown in step 565. Subsequent memory accesses open the appropriate pages once the internal configuration register writes have occurred.

As indicated in step 620, a high priority refresh may also cause both pages to be closed. A refresh circuit 330 shown in FIG. 3 may queue up to four refresh requests for the arbiter before elevating one of the refresh requests to a high priority refresh request and so indicating on a bus 332. Since high priority refresh requests are serviced by the arbiter 240 after the current command completes, the impact of precharge delay can be reduced by automatically closing the memory pages open during execution of the current command.

Finally, as indicated in steps 625 and 630, encountering an A.G.P. expedite command may also cause both pages to be closed. The arbiter 240 signals the expedite command on signal line 328 to the paging control circuit 300 which then determines whether an A.G.P. non-snoopable queue is currently being serviced as indicated in step 630. If such a queue is not being serviced, a PIPE# based A.G.P. command is not currently being processed, and the expedite command (which is a PIPE# based A.G.P. command) is likely to access a different page than those currently being accessed. Therefore, the paging control circuit 300 signals the memory interface 255 to execute the current command such that the open pages are automatically closed at the end of that command.

Returning to FIG. 5, if an idle bus is detected in step 570 (i.e., no next command is available at the arbiter 240), an idle counter 335 is notified via signal line(s) 337 and is incremented as shown in step 575. The idle counter 335 may then test whether it has reached a count of consecutive idle cycles indicated by page time-out select (PTOS) bits 342 in the configuration register 340 as is indicated in step 585. In one embodiment, two PTOS bits may indicate one of four choices, sixteen clocks, four clocks, never, or always (i.e., close pages if there is no new request), and sixteen clocks may be used as a default value.

As indicated in step 590, if the PTOS count has been reached, the idle timer 335 signals the page management circuit 250 via signal line(s) 338 and both pages are closed. If the PTOS count is not reached, as shown in step 580, pages are left at their current status. Closing pages based on the expiration of an idle timer generally optimizes memory accesses because sequential memory accesses typically do not generate idle cycles, and therefore the idle cycles are an indication that non-sequential access is likely to occur.

If none of the illustrated page closing conditions occur, one embodiment of the present invention leaves open memory pages in their current state. An evaluation of these possible page closing conditions again occurs when the arbiter selects a new command or an idle cycle. In other embodiments, additional page closing conditions and configuration options may be added.

Thus, a variety of page closing considerations may be included in a page management circuitry which services a multiple-port bus bridge. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
   receiving a plurality of memory access commands from a plurality of command ports;
   selecting a next memory access command to be executed after a current memory access command from said plurality of memory access commands;
   closing a number of pages of memory in response to the next memory access command, the number being determined at least in part on which of the plurality of command ports provides the next memory access command wherein closing the number of pages further comprises closing multiple open pages if the next memory access command is from a different one of the plurality of command ports than the current memory access command and the next memory access command is a page miss.

2. The method of claim 1 wherein closing a number of pages further comprises:
   closing the number of pages also based on a bit in a configuration register.

3. A method comprising:
   receiving a plurality of memory access commands from a plurality of command ports;
   selecting a next memory access command to be executed after a current memory access command from said plurality of memory access commands;
   closing a number of pages of memory in response to the next memory access command, the number being determined at least in part on which of the plurality of command ports provides the next memory access command, wherein closing a number of pages further comprises:
   closing multiple open pages in a currently accessed memory row if the next memory access command is a row miss.

4. The method of claim 1 wherein closing a number of pages further comprises:
   closing the number of pages also on a determination of a command type of at least one of the current memory access command and the next memory access command.

5. The method of claim 1 wherein closing multiple pages is performed if a configuration bit is set to a first setting, and wherein the method further comprises:
   closing only a first page which needs to be closed to access a page indicated by the next memory access command if the next memory access command is from a different one of the plurality of memory access ports than the current memory access command and the next memory access command is a page miss and the configuration bit is set to a second setting.

6. The method of claim 1 wherein closing a number of pages further comprises:
   closing only a first page which needs to be closed to access a page indicated by the next memory access command if the next memory access command is a page miss.

7. The method of claim 6 wherein closing only the first page is performed if a configuration bit is set to a first setting, and wherein the method further comprises:
   closing multiple open pages if the next memory access command is a page miss and the configuration bit is set to a second setting.

8. The method of claim 1 wherein closing a number of pages further comprises:
   closing multiple open pages if the next memory access command is a graphics translation look-aside buffer (GTLB) miss and the GTLB miss is a page miss.

9. The method of claim 8 further comprising:
   closing multiple open pages after servicing the GTLB miss.

10. The method of claim 1 wherein closing a number of pages further comprises:
    closing multiple open pages if the next memory access command is a command which writes to an internal configuration register.

11. The method of claim 1 wherein closing a number of pages further comprises:
    closing multiple open pages if a refresh request is generated.

12. A method comprising:
    receiving a plurality of memory access commands from a plurality of command ports;
    selecting a next memory access command to be executed after a current memory access command from said plurality of memory access commands;
    closing a number of pages of memory in response to the next memory access command, the number being determined at least in part on which of the plurality of command ports provides the next memory access command, wherein the next memory access command is an A.G.P. expedite access command from a first one of the plurality of command ports and wherein the method further comprises:
    closing multiple open pages unless the current memory access command is a non-snoopable A.G.P. memory access command.

13. The method of claim 1 wherein closing a number of pages further comprises:
    closing multiple pages if the next memory access command is an idle command.

14. The method of claim 12 wherein closing multiple pages comprises:
    incrementing an idle counter in response to the idle command;
    testing whether an idle count has been reached; and
    if the idle count has been reached, then closing multiple pages.

15. An apparatus comprising:
    a first interface circuit;
    a second interface circuit;
    an arbiter circuit coupled to select a next memory access command from one of the first interface circuit and the second interface circuit;
    a page management circuit coupled to the arbiter circuit which is capable of generating a plurality of paging command signals to close a number of pages of memory based at least in part on the next memory access command selected by the arbiter circuit, wherein the page management circuit is further coupled to receive a stream switch signal and closes both a first page and a second page if the next memory access command is a page miss and the stream switch signal is asserted and a first field in a configuration register is in a first state.

16. The apparatus of claim 15 further comprising:

a configuration register coupled to the page management circuit and coupled to be written to using the first interface circuit, wherein the plurality of paging command signals generated by the page management circuit are also based on a value in the configuration register.

17. The apparatus of claim 16 wherein the page management circuit is coupled to generate paging command signals to close only the first page if the next memory access command is a page miss and the stream switch signal is asserted and the first field in the configuration register is in a second state.

18. The apparatus of claim 15 wherein the page management circuit further comprises:

a first page register capable of storing a first value indicating a currently open even page of memory;

a second page register capable of storing a second value indicating a currently open odd page of memory;

a first comparator coupled to compare a next command page number to the first value;

a second comparator coupled to compare the next command page number to the second value;

a paging control circuit coupled the first and second comparators and coupled to load one of the first page register and the second page register if the first comparator and the second comparator indicate that the next command page number differs from the first value and the second value.

19. The apparatus of claim 18 wherein the paging control circuit generates paging command signals to close a first page which needs to be closed to access a page indicated by the next memory access command if the first comparator and the second comparator indicate that the next command page number differs from the first value and the second value and if a second field in the configuration register is in a first state, the affected page being the currently open odd page of memory if the next command page number is an odd number, and being the currently open even page of memory if the next command page number is an even number.

20. The apparatus of claim 18 wherein the paging control circuit generates paging command signals to close both a first page and a second page if the first comparator and the second comparator indicate that the next command page number differs from the first value and the second value and if the second field in the configuration register is in a second state.

* * * * *

UNITED STATES PATENT AND TRADEMARK OFFICE
CERTIFICATE OF CORRECTION

PATENT NO.    : 6,199,145 B1
DATED         : March 6, 2001
INVENTOR(S)   : Ajanovic et al.

It is certified that error appears in the above-identified patent and that said Letters Patent is hereby corrected as shown below:

Column 3,
Line 18, delete "In".

Column 4,
Line 8, delete "paces" and insert -- pages --.

Signed and Sealed this

Twenty-sixth Day of February, 2002

Attest:

Attesting Officer

JAMES E. ROGAN
*Director of the United States Patent and Trademark Office*